United States Patent
Iwata et al.

(10) Patent No.: US 11,279,515 B2
(45) Date of Patent: Mar. 22, 2022

(54) FABRICATING METHOD FOR QUARTZ VIAL

(71) Applicant: NEXUS COMPANY INC., Kyoto (JP)

(72) Inventors: Kenji Iwata, Kyoto (JP); Toshihito Kashiwagi, Kasai (JP)

(73) Assignee: NEXUS COMPANY INC., Kyoto (JP)

( * ) Notice: Subject to any disclaimer, the term of this patent is extended or adjusted under 35 U.S.C. 154(b) by 314 days.

(21) Appl. No.: 16/309,690

(22) PCT Filed: Jun. 19, 2018

(86) PCT No.: PCT/JP2018/023283
§ 371 (c)(1),
(2) Date: Dec. 13, 2018

(87) PCT Pub. No.: WO2019/004008
PCT Pub. Date: Jan. 3, 2019

(65) Prior Publication Data
US 2019/0329932 A1    Oct. 31, 2019

(30) Foreign Application Priority Data
Jun. 27, 2017   (JP) ................. 2017-125123

(51) Int. Cl.
*C03B 23/09* (2006.01)
*C03B 23/20* (2006.01)
(Continued)

(52) U.S. Cl.
CPC ............ *B65D 13/02* (2013.01); *C03B 23/207* (2013.01)

(58) Field of Classification Search
CPC ........ C03B 23/09; C03B 23/20; C03B 23/207
See application file for complete search history.

(56) References Cited

U.S. PATENT DOCUMENTS 3,346,357 A * 10/1967 Baak ..................... C03B 23/207
   65/33.5
3,362,435 A * 1/1968 Meyer ..................... C03B 23/09
   138/178

(Continued)

FOREIGN PATENT DOCUMENTS

| CN | 1608019 A | 4/2005 |
| CN | 102167500 A | 8/2011 |

(Continued)

OTHER PUBLICATIONS

Sep. 17, 2020 Office Action issued in Chinese Patent Application No. 201880002386.6.

(Continued)

*Primary Examiner* — Cynthia Szewczyk
(74) *Attorney, Agent, or Firm* — Oliff PLC (57) ABSTRACT

In a fabricating method for a quartz vial having a body part for containing a substance, a bottom part closing a lower end of the body part, a cylindrical neck part disposed at an upper end of the body part, a cylindrical mouth part disposed above the neck part and having an outer diameter larger than that of the neck part, and a tapered portion connecting the mouth part and the neck part to each other, outer peripheral surfaces of the tapered portion and the neck part are formed by shaving, and the body part that is separately fabricated is welded to the neck part. Thus, quartz vials having a predetermined shape can be mass-fabricated.

11 Claims, 4 Drawing Sheets

(51) Int. Cl.
  *B65D 13/02* (2006.01)
  *C03B 23/207* (2006.01)

(56) References Cited

U.S. PATENT DOCUMENTS

| | | | | |
|---|---|---|---|---|
| 3,368,588 | A | * | 2/1968 | Meyer .................. C03B 23/097 138/178 |
| 3,809,599 | A | * | 5/1974 | Pei ........................ C03B 11/06 428/34.4 |
| 5,221,311 | A | * | 6/1993 | Rising .................... B01L 3/569 215/47 |
| 6,227,392 | B1 | | 5/2001 | Balzeau |
| 2002/0046580 | A1 | | 4/2002 | Matsuo et al. |
| 2005/0059162 | A1 | | 3/2005 | Wohleb |
| 2005/0067365 | A1 | | 3/2005 | Hanafusa et al. |
| 2006/0267250 | A1 | * | 11/2006 | Gerretz ................ C03B 23/092 264/328.1 |
| 2007/0245773 | A1 | | 10/2007 | Peekhaus et al. |
| 2008/0171147 | A1 | | 7/2008 | Singh |
| 2014/0116011 | A1 | * | 5/2014 | Eisen .................... C03B 23/207 53/467 |
| 2015/0114043 | A1 | * | 4/2015 | Risch .................. C03B 23/0496 65/29.18 |
| 2016/0107918 | A1 | * | 4/2016 | Delgado Carranza .. C03B 23/04 53/426 |
| 2016/0137346 | A1 | * | 5/2016 | Perlman ................ C03B 23/09 215/41 |
| 2016/0236962 | A1 | * | 8/2016 | Baratta .................. B65D 15/24 |

FOREIGN PATENT DOCUMENTS

| | | |
|---|---|---|
| CN | 102615699 A | 8/2012 |
| DE | 69809361 T2 | 4/2003 |
| EP | 905033 A1 | 3/1999 |
| EP | 1219571 A2 | 7/2002 |
| ES | 2186986 T3 | 5/2003 |
| FR | 2769003 A1 | 4/1999 |
| JP | S58-41732 A | 3/1983 |
| JP | H09-241030 A | 9/1997 |
| JP | 2001-97734 A | 4/2001 |
| JP | 2002-012433 A | 1/2002 |
| JP | 2002-255577 A | 9/2002 |
| JP | 2005-192888 A | 7/2005 |
| JP | 2008-509874 A | 4/2008 |
| KR | 10-2009-0077255 A | 7/2009 |
| WO | 2005/032685 A2 | 4/2005 |

OTHER PUBLICATIONS

Guan et al., "Research on Precision Grinding Technology for Melted Quartz Workpieces," Aviation Precision Manufacturing Technology, vol. 36, Issue No. 2, pp. 16-18, Apr. 2000. (with Abstract).
Jul. 31, 2018 International Search Report issued in International Patent Application No. PCT/JP2018/023283.
Jul. 31, 2018 Written Opinion issued in International Patent Application No. PCT/JP2018/023283.
Kabushikigaisha Asahi Seisakusho, Sekiei Glass Seihin Lineup Nejikiri Kakou Seihin (Asahi Glassplant Inc. Quartz Glass Instrument Lineup, Thread-Cut Product), [online], Jul. 5, 2015, <https://web.archive.org/web/20130705003738/http://www.theglassplant.com:80/products12.html>.
Apr. 6, 2021 Office Action issued in Japanese Patent Application No. 2017-125123.
Apr. 9, 2021 Office Action issued in Korean Patent Application No. 10-2019-7027221.

* cited by examiner

FABRICATING METHOD FOR QUARTZ VIAL

TECHNICAL FIELD

The present invention relates to a fabricating method for a vial used for containing a chemical agent or the like.

BACKGROUND ART

Chemical agents or vaccines may be stored in a vial for containing and storing chemical agent for months or sometimes years. For such purposes, vials for chemical agent made of hard glass, such as borosilicate glass, have been conventionally used. However, in some cases where a chemical agent is stored in a vial made of hard glass for a long time, boron, sodium or the like contained in the material of the vial may elute into the chemical agent, which causes a problem in the preservation of the chemical agent.

CITATION LIST

Patent Literature

Patent Literature 1: JP 2005-192888 A ([0019] and FIG. 2)

SUMMARY OF INVENTION

Technical Problem

There are many kind of glasses including doped glass, such as the above-described hard glass, in which silicon dioxide is added with various elements according to purposes, and quartz glass made of high purity silicon dioxide. The above-described problem can be solved by using a vial made of quartz glass, but it has been very difficult to make a vial having the same shape as that of the conventional vial made of hard glass from a quartz material in a large quantity and at a reduced cost by a method similar to conventional method.

Figure 8A:
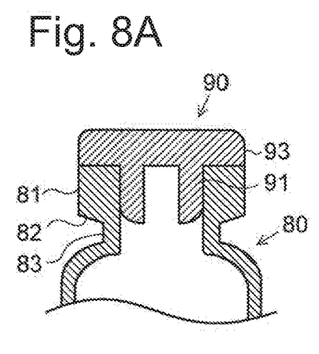
FIG. 8A shows a state in which a resin plug is attached to a mouth part of the vial.

A mouth part 81 of a vial 80 is plugged with a resin plug 90 which is made of an elastomer material such as butyl rubber and can be pierced by an injection needle (FIG. 8A). The resin plug 90 is covered with a lid 95 (a vial cap) made of relatively soft metal such as aluminum (FIG. 8B), and then, as shown in FIG. 8C, the lid 95 is caulked (tightly crimped) to be thus tightly closed (see Patent Literature 1). Here, it is important to provide a predetermined shape on the side of the vial 80 rather than on the side of the resin plug 90 in order to securely seal the vial 80 with the resin plug 90 and the lid 95 and achieve a long-term storage of contents.

Figure 8B:
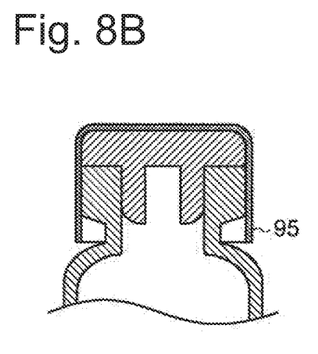
FIG. 8B shows a state in which the resin plug is covered with an aluminum cap.
Figure 8C:
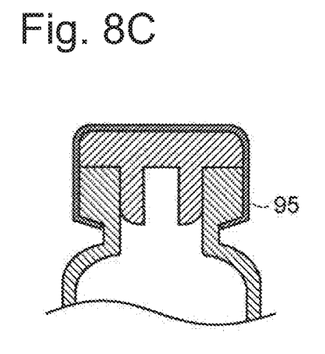
FIG. 8C shows a state in which the aluminum cap is caulked.

More specifically, it is necessary to form a tapered portion 82 having an inversely tapered outer diameter downward between the mouth part 81 of the vial 80 and a neck 83 located under the mouth part 81 in order to securely caulk (tightly crimp) the lid 95 (see FIGS. 8A to 8C).

In case of a typical vial 80 made of doped glass such as borosilicate glass, the mouth part 81 and the tapered portion 82 having the above-described shape are formed by hot working. However, quartz glass has a very high softening temperature, and is difficult to form by hot working, resulting in difficulty in mass-fabricating vials with a mouth part and a tapered portion having precise shapes.

In view of the above, a problem to be solved by the present invention is to provide a method capable of fabricating numerous quartz vials having a predetermined shape.

Solution to Problem

According to the present invention accomplished to solve the above-described problem, a fabricating method for a quartz vial having a body part for containing a substance, a bottom part closing a lower end of the body part, a cylindrical neck part disposed at an upper end of the body part, a cylindrical mouth part disposed above the neck part and having an outer diameter larger than that of the neck part, and a tapered portion connecting the mouth part and the neck part includes the step of forming an outer peripheral surface of the tapered portion by shaving.

In the fabricating method for a quartz vial according to the present invention, the outer peripheral surface of the tapered portion is formed by shaving, thus enabling the quartz vial having the tapered portion having a precisely predetermined shape to be fabricated. Consequently, it is possible to mass-fabricate quartz vials for long-term storage of a chemical agent or the like and having excellent sealing capability. "Shaving" may include grinding, cutting, polishing, and the like.

With the fabricating method for a quartz vial according to the present invention, it is desirable that an outer peripheral surface of the neck part be formed also by shaving.

In this case, either of the outer peripheral surface of the tapered portion and the outer peripheral surface of the neck part may be formed first. In any way, having is performed in such a manner that an end of the tapered portion having a smaller outer diameter comes smoothly to one end of the neck part.

With the fabricating method for a quartz vial according to the present invention, it is also desirable that an inner peripheral surface of the mouth part be formed by shaving.

As a method for forming the body part of the quartz vial, there are two methods: (1) a method of making the body part out of a quartz glass member different from a quartz glass member used for forming the tapered portion and its neighboring portions; and (2) a method of making the body part by hot working out of the quartz glass member, out of which the tapered portion and its neighboring portions are made. In the first method, after the body part is made out of different quartz glass member, the body part is welded to the quartz glass member out of which the tapered portion and its neighboring portions is made.

In the first method, the fabricating method for a quartz vial according to the present invention having a body part for containing a substance, a bottom part closing a lower end of the body part, a cylindrical neck part disposed at an upper end of the body part, a cylindrical mouth part disposed above the neck part and having an outer diameter larger than that of the neck part, and a tapered portion connecting the mouth part and the neck part includes the steps of: forming outer peripheral surfaces of the tapered portion and the neck part by shaving; and joining, to the neck part, the body part that is separately fabricated.

Here, in joining the body part to the neck part, the lower end of the body part may or may not be closed by the bottom part. In the latter, after joining the body part is completed, the lower end of the body part is thermally closed, thus forming the bottom part. Alternatively, a separately formed bottom part may be welded to the body part.

It is desirable that in joining the body part to the neck part, the tapered portion adjacent to the neck part have the mouth part at an end opposite to the neck part. This mouth part may be formed integrally with the tapered portion and the neck part, or the mouth part may be formed separately from the tapered portion and the neck part, and then welded to the tapered portion. Additionally, inner peripheral surfaces of the mouth part, the tapered portion, and the neck part are formed prior to joining the body part to the neck part. Also at this time, the inner peripheral surfaces are desirably formed by shaving.

Alternatively, in the first method, a separately fabricated neck part may be welded to the tapered portion having the outer peripheral surface formed by shaving.

Another fabricating method for a quartz vial according to the present invention in the first method having a body part for containing a substance, a bottom part closing a lower end of the body part, a cylindrical neck part disposed at an upper end of the body part, a cylindrical mouth part disposed above the neck part and having an outer diameter larger than that of the neck part, and a tapered portion connecting the mouth part and the neck part includes the steps of: forming an outer peripheral surface of the tapered portion by shaving; and joining, to the tapered portion, the neck part that is separately fabricated.

In this case, in joining the neck part to the tapered portion, the body part (or the body part and the bottom part) may be disposed at the neck part at an end opposite to a side on which the tapered portion will be welded. The body part (or the body part and the bottom part) may be formed integrally with the neck part. The body part may be formed separately from the neck part, and then welded to the neck part.

It is desirable that in joining the neck part to the tapered portion, the mouth part be disposed at the tapered portion at an end opposite to the side on which the neck part will be welded. This mouth part may be formed integrally with the tapered portion. Alternatively, the mouth part may be formed separately from the tapered portion, and then welded to the tapered portion.

The inner peripheral surfaces of the mouth part and the tapered portion are formed prior to joining the neck part to the tapered portion. Also at this time, the inner peripheral surfaces are desirably formed by shaving.

"Joining" according to the present invention typically means bringing heated glasses into contact with each other, that is, thermal fusion. In addition to that, other joining methods may be used, for example, room-temperature joining such as surface activated bonding, hydrofluoric acid bonding, and optical contact.

In the second method (2) described before, the fabricating method for a quartz vial according to the present invention having a body part for containing a substance, a bottom part closing a lower end of the body part, a cylindrical neck part disposed at an upper end of the body part, a cylindrical mouth part disposed above the neck part and having an outer diameter larger than that of the neck part, and a tapered portion connecting the mouth part and the neck part includes the steps of: forming an outer peripheral surface of the tapered portion and an outer peripheral surface of the neck part by shaving a quartz glass member; and forming the body part by hot working a portion of the quartz glass member adjacent to the neck part.

Here, "hot working" means forming with thermally softening or fusing quartz glass. In the above-described fabricating method, the step of forming the tapered portion and the neck part and the step of forming the body part may be performed in this order or in a reversed order. In the step of forming the body part, the bottom part may be formed together with the body part. Alternatively, only the body part may be formed first, and then, the bottom part made of another quartz glass member may be welded to the body part.

Furthermore, the present invention provides a quartz vial fabricated by the first method.

Specifically, the quartz vial according to the present invention includes a body part for containing a substance, a bottom part closing a lower end of the body, a cylindrical neck part disposed at an upper end of the body part, a cylindrical mouth part disposed above the neck part and having an outer diameter larger than that of the neck part, and a tapered portion connecting the mouth part and the neck part. Here, the quartz vial includes a welded portion of quartz glass members at a position between a lower end of the tapered portion and a lower end of the body part.

The fabricating method for a quartz vial according to the present invention is applicable to the above-described vial sealed with a resin plug and a lid as well as a vial (i.e., a vial of a screwed mouth type) sealed with a screw cap. In this case, the fabricating method for a quartz vial according to the present invention having a body part for containing a substance, a bottom part closing a lower end of the body part, and a cylindrical mouth part disposed at an upper end of the body part and having a thread at an outer peripheral surface, includes the step of forming the thread by shaving.

Advantageous Effects of Invention

In the fabricating method for a quartz vial according to the present invention, the tapered portion (or the tapered portion and the neck part) of the quartz vial is formed by shaving, and therefore, it is possible to fabricate the quartz vial having the tapered portion (or the tapered portion and the neck part) precisely having a predetermined shape. Consequently, it is possible to mass-fabricate quartz vials capable of long-term storage of a chemical agent or the like and excellent sealing capability.

BRIEF DESCRIPTION OF DRAWINGS

FIGS. 8A to 8C are views for describing a sealing method for a vial, in which

DESCRIPTION OF EMBODIMENTS

Modes for carrying out the present invention will be described with reference to the attached drawings.

Figure 1:
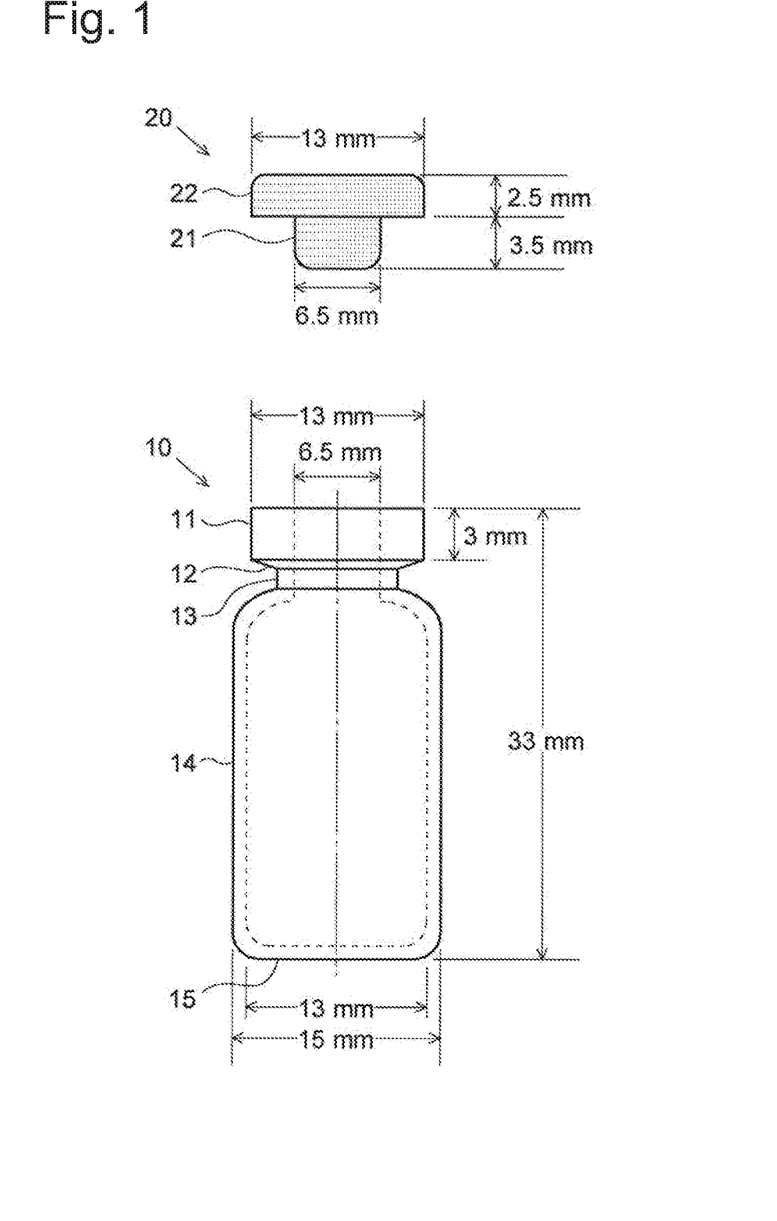
FIG. 1 is a side view showing the shapes and dimensions of a quartz vial and a rubber plug attached to a mouth part of the quartz vial in a first embodiment according to the present invention.

FIG. 1 shows the configuration of a quartz vial 10 and a rubber plug 20 (a resin plug) attached to the quartz vial 10 in a first embodiment according to the present invention. The quartz vial 10 is entirely made of quartz glass, and includes a cylindrical body part 14 for containing substances such as a chemical agent, a bottom part 15 for closing the lower end of the body part 14, a cylindrical neck part 13 that is disposed at the upper end of the body part 14 and has a smaller outer diameter than that of the body part 14, a cylindrical mouth part 11 that is disposed above the neck part 13 and has a larger outer diameter than that of the neck part 13, and a tapered portion 12 connecting the mouth part 11 and the neck part 13 to each other. Through holes having the same diameter axially extend through the respective centers of the mouth part 11, the tapered portion 12, and the neck part 13, thus forming a passage from the upper end of the mouth part 11 to the lower end of the neck part 13. The passage communicates with the inside space of the body part 14.

The rubber plug 20 is made of, for example, butyl rubber, and includes a plug part 21 that is inserted into the hole formed at the mouth part 11 of the quartz vial 10 and a disk part 22 that is brought into contact with the upper surface of the mouth part 11 when the plug part 21 is inserted into the mouth part 11 of the quartz vial 10.

The outer diameter of the mouth part 11 of the quartz vial 10 is equal to the diameter of the disk part 22 of the rubber plug 20, and furthermore, the inner diameter of the base 11 part (i.e., the diameter of the through hole) is equal to the outer diameter of the plug part 21 of the rubber plug 20. Moreover, the outer diameter of the upper end of the tapered portion 12 of the quartz vial 10 is equal to the outer diameter of the mouth part 11 whereas the outer diameter of the lower end of the tapered portion 12 is equal to the outer diameter of the neck part 13. The respective dimensions of the component parts are exemplified in FIG. 1.

A fabricating method for the quartz vial 10 in the present embodiment will be explained below with reference to FIGS. 2A to 2C. First, a quartz glass member having a predetermined shape and a predetermined size is prepared, and then, is subjected to hot working or grinding by the use of a grinding wheel, thus fabricating the mouth part 11, the neck part 13, and the tapered portion 12 of the quartz vial 10 (the upper section of FIG. 2A). At this time, the outer peripheral surface of at least the tapered portion 12 (desirably, the tapered portion 12 and the neck part 13) is formed by grinding. The inner peripheral surfaces of the mouth part 11, the tapered portion 12, and the neck part 13 may be subjected to grinding. The body part 14 without a bottom is made of another quartz glass member (hereinafter referred to as a second quartz glass member) other than the above-described quartz glass member (hereinafter referred to as a first quartz glass member). The body part 14 is provided with an upper opening 14a having the same outer diameter and the same inner diameter as those of the neck part 13 (the lower section of FIG. 2A). The body part 14 can be fabricated, for example, by using a quartz glass tube as the second quartz glass member and by narrowing its diameter by a drawing roller while heating one end thereof with a burner.

Figure 2A:
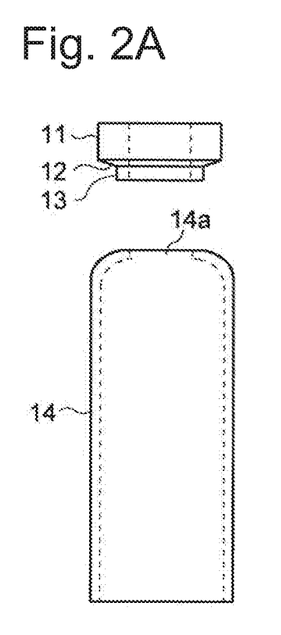
FIGS. 2A to 2C are views for describing a fabricating method for the quartz vial in the present embodiment.
Figure 2B:
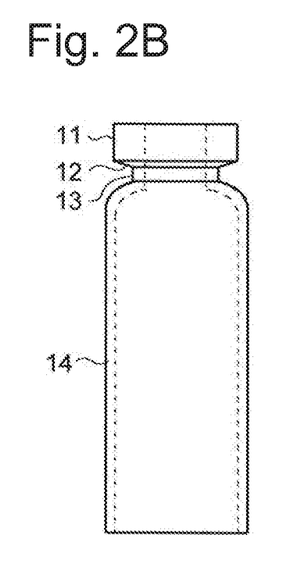

Thereafter, the lower end of the neck part 13 made of the first quartz glass member and the peripheral edge of the upper opening 14a of the body part 14 made of the second quartz glass member are heated by the burner, and then, they are brought into contact with each other, so that the part made of the first quartz glass member and the part made of the second quartz glass member are thermally fused to each other (FIG. 2B). Here, the outer peripheral surface of the tapered portion 12 (or the tapered portion 12 and the neck part 13) is ground into a frosted surface, and therefore, it is desirable that the frosted surface should be heated by the burner during the thermal fusion to smoothly fuse the surface having fine unevenness.

Figure 2C:
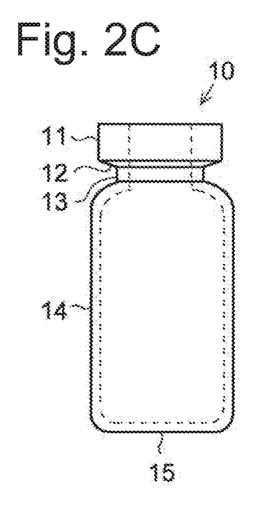

Subsequently, the lower end of the body part 14 is sealed while being heated, thus forming the bottom part 15 of the quartz vial 10 (FIG. 2C). As a consequence, the quartz vial 10 is completed as a product.

In FIGS. 2A to 2C, the part made of the first quartz glass member and the part made of the second quartz glass member are welded to each other in the state in which the lower end of the body part 14 (i.e., an end opposite to the upper opening 14a) is open. However, the lower end of the body part 14 may be sealed (i.e., the bottom part 15 of the quartz vial 10 may be formed), before the part made of the first quartz glass member and the part made of the second quartz glass member may be welded to each other.

Figure 3:
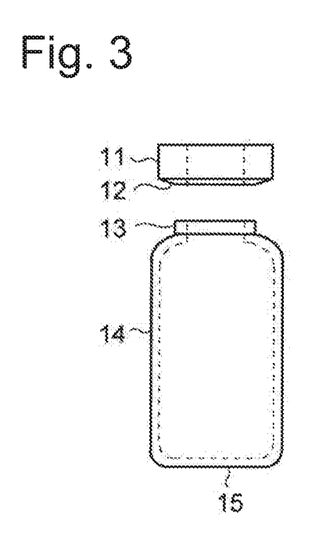
FIG. 3 is a view for describing another example of the fabricating method for the quartz vial in the present embodiment.
Figure 4:
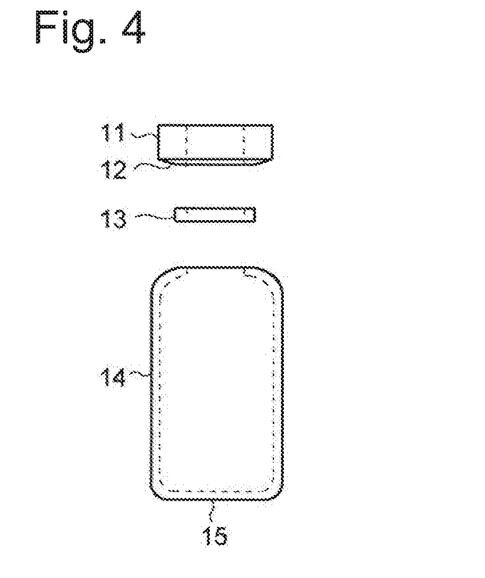
FIG. 4 is a view for describing a further example of the fabricating method for the quartz vial in the present embodiment.

Alternatively, the quartz vial 10 in the present embodiment may be fabricated by separately forming a part integrally formed with the mouth part 11 and the tapered portion 12 and a part integrally formed with the neck part 13, the body part 14, and the bottom part 15, as shown in FIG. 3, and then, by joining these two parts to each other. Alternatively, the quartz vial 10 in the present embodiment may be fabricated by separately fabricating a part integrally formed with the mouth part 11 and the tapered portion 12, a part consisting of the neck part 13, and a part integrally formed with the body part 14 and the bottom part 15, as shown in FIG. 4, and then, by joining these three parts to each other. In any cases, the outer peripheral surface of at least the tapered portion 12 (desirably, the tapered portion 12 and the neck part 13) is formed by shaving. At this time, the bottom part 15 may be formed (that is, the lower end of the body part 14 may be sealed) before or after the joining.

Figure 5A:
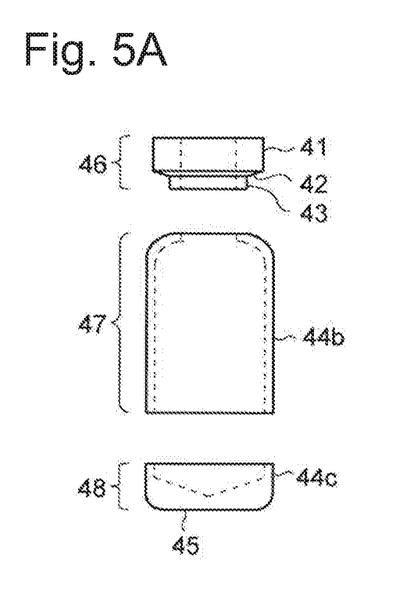
FIG. 5 is a view for describing a still further example of the fabricating method for the quartz vial in the present embodiment.
Figure 5B:
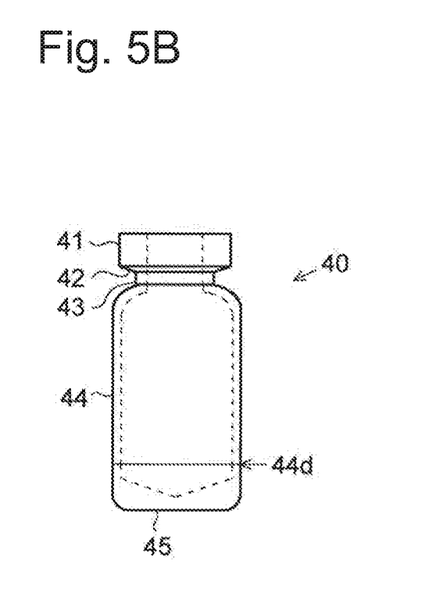

In the case where a quartz vial 40 having a conically recessed inner bottom shown in FIG. 5B is fabricated, a first part 46 obtained by integrally forming a mouth part 41, a tapered portion 42, and a neck part 43, a second part 47 serving as an upper portion 44b of a body part 44, and a third part 48 having a conically recessed inner bottom and serving as a lower portion 44c of the body part 44 are separately fabricated, as shown in, for example, FIG. 5A. The quartz vial 40 is fabricated by joining these three parts 46, 47, and 48. Here, although the neck part 43 is formed integrally with the mouth part 41 and the tapered portion 42 in FIG. 5A, the neck part 43 may be formed integrally with the upper portion of the body part 44 instead.

Figure 6A:
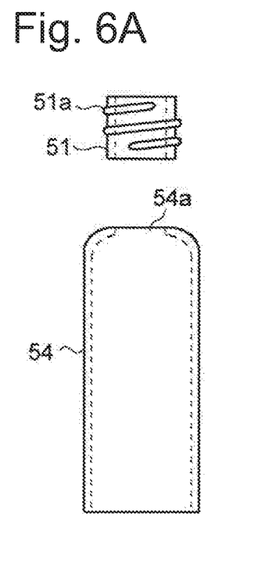
FIGS. 6A to 6C is a view for describing a fabricating method for a screwed vial by the fabricating method for the quartz vial in the present embodiment.
Figure 6B:
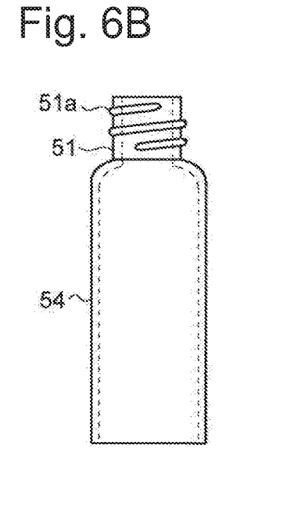
Figure 6C:
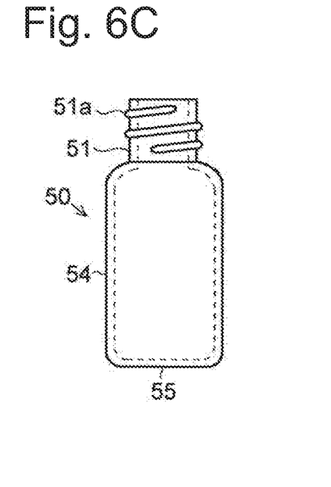

Moreover, the fabricating method for the quartz vial according to the present invention is applicable to a quartz vial of a screwed mouth type. As shown in FIG. 6C, a quartz vial 50 of a screwed mouth type is provided with a mouth part 51 having a thread 51a at the upper end of a body part 54 for containing a chemical agent or the like. A fabricating method for the vial 50 of a screwed mouth type will be explained with reference to FIGS. 6A to 6C. First, a cylindrical part is made of a quartz glass member (a first quartz glass member) having a proper size and a proper shape by, for example, fusibly molding or the like such that the cylindrical part has the same length as that of the mouth part 51 of the quartz vial 50 to be fabricated and an outer diameter larger than that of the mouth part 51 (except for the thread 51*a*), and the same inner diameter as that of the mouth part 51. The outer peripheral surface of the part is subjected to grinding, thus forming the thread 51*a* (the upper section of FIG. 6A). Thereafter, in the same manner as that explained with reference to FIGS. 2A to 2C, the body part 54 without a bottom but with the upper opening 54*a* is made of a second quartz glass member having a proper size and a proper shape (the lower section of FIG. 6A). Next, the part made of the first quartz glass member (i.e., the mouth part 51) and the part made of the second quartz glass member (i.e., the body part 54) are thermally fused to each other (FIG. 6B). The lower end of the body part 54 is sealed, to thus form a bottom part 55, thereby completing the quartz vial 50 of a screwed mouth type (FIG. 6C). Also in this case, the outer peripheral surface of the mouth part 51 is ground into a frosted surface. In view of this, it is desirable that the frosted surface should be heated by a burner during the thermal fusion to smoothly fuse the surface having fine unevenness.

The quartz vial fabricated by either one of the above-described methods in the present embodiment has a welded portion formed by joining the quartz glasses to each other somewhere from the lower end of the tapered portion to the lower end of the body part (in the case of the screwed mouth type, from the lower end of the mouth part to the lower end of the body part). The quartz vial 10 fabricated by the method shown in, for example, FIGS. 2A to 2C has a welded portion on the boundary between the neck part 13 and the body part 14. Furthermore, the quartz vial 10 fabricated by the method shown in, for example, FIG. 3 has a welded portion on the boundary between the tapered portion 12 and the neck part 13. Additionally, the quartz vial 10 fabricated by the method shown in FIG. 4 has welded portions on the boundary between the tapered portion 12 and the neck part 13 and the boundary between the neck part 13 and the body part 14. Moreover, the quartz vial 40 fabricated by the method shown in FIGS. 5A and 5B has a welded portion on the boundary between the neck part 43 and the body part 44, and furthermore, a welded portion (reference numeral 44*d* in FIG. 5B) somewhere between the upper end and the lower end of the body part 44. In addition, the quartz vial 50 fabricated by the method shown in FIGS. 6A to 6C has a welded portion on the boundary between the mouth part 51 and the body part 54.

Figure 7A:
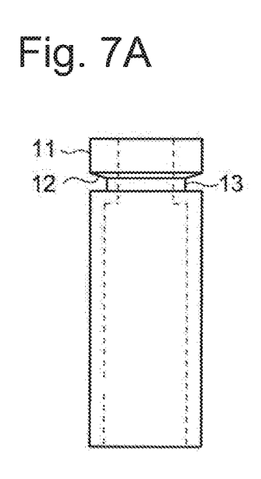
FIGS. 7A to 7C are views for describing a fabricating method for a quartz vial in a second embodiment according to the present invention.
Figure 7B:
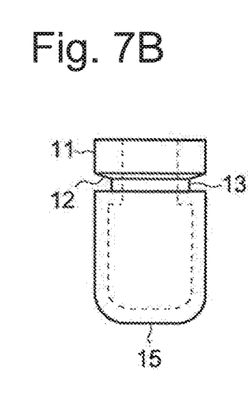
Figure 7C:
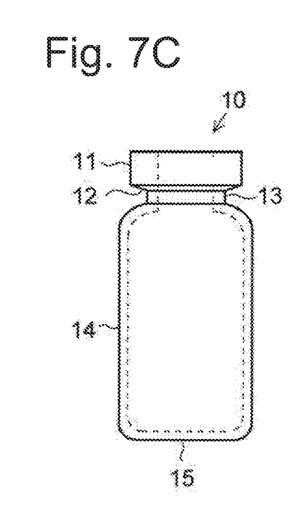

Subsequently, a fabricating method for a quartz vial in a second embodiment according to the present invention will be explained with reference to FIGS. 7A to 7C. By a fabricating method for a quartz vial 10 in the present embodiment, the entire quartz vial is formed integrally with a single quartz glass member. Here, the shape of the quartz vial 10 that will be a product and the dimension of each component part are similar to those shown in FIG. 1. First, a cylindrical part is made of a quartz glass member having a proper size and a proper shape by, for example, fusibly molding or the like. Thereafter, a mouth part 11, a neck part 13, and a tapered portion 12 for the quartz vial 10 are formed by hot working by the use of a burner, grinding by the use of a grinding wheel, or the like (FIG. 7A). At this time, the outer peripheral surface of at least the tapered portion 12 (desirably, the tapered portion 12 and the neck part 13) is formed by shaving. Here, a surface is shaved into a frosted surface, and therefore, it is desirable that the frosted surface should be heated by the burner or the like to smoothly fuse the surface having fine unevenness. Subsequently, the lower end of the cylindrical part is sealed while being heated by the burner, thus forming a bottom part 15 of the quartz vial 10 (FIG. 7B). Next, a body part 14 of the quartz vial 10 is formed by increasing the inner diameter, outer diameter, and length of a portion below the neck part 13 (that is, a portion adjacent to the neck part 13 of the cylindrical part and opposite to the tapered portion 12) by blowing (FIG. 7C). As a consequence, the quartz vial 10 is completed as a product.

The vial 50 of a screwed mouth type shown in FIG. 6C can be fabricated by integral forming in the above-described manner. In this case, a cylindrical part is made of the quartz glass member having a proper size and a proper shape by, for example, fusibly molding or the like, and then, is subjected to grinding, thus achieving a mouth part 51 having a thread 51*a*. Thereafter, a bottom part 55 is formed by sealing the lower end of the part in the same method as that explained with reference to FIGS. 7A to 7C. Thereafter, the body part 54 is formed by blowing, thus completing the quartz vial 50 of a screwed mouth type as a product.

REFERENCE SIGNS LIST

10, 40, 50 . . . Quartz Vial
11, 41, 51 . . . Mouth part
51*a* . . . Thread
12, 42 . . . Tapered Portion
13, 43 . . . Neck part
14, 44, 54 . . . Body part
14*a*, 54*a* . . . Upper Opening
44*d* . . . Welded Portion
15, 45, 55 . . . Bottom part
20 . . . Rubber Plug
21 . . . Plug part
22 . . . Disk part

The invention claimed is:

1. A fabricating method for a quartz vial having a body part for containing a substance, a bottom part closing a lower end of the body part, a cylindrical neck part disposed at an upper end of the body part, a cylindrical mouth part disposed above the neck part and having an outer diameter larger than an outer diameter of the neck part, and a tapered portion connecting the mouth part and the neck part, the fabricating method comprising the steps of:

forming outer peripheral surfaces of the tapered portion and the neck part by grinding, cutting or polishing; and after the step of forming the outer peripheral surfaces of the tapered portion and the neck part by grinding, cutting or polishing, joining by thermal fusion, to the neck part, the body part that is separately fabricated.

2. The fabricating method for a quartz vial according to claim 1, further comprising the step of forming an inner peripheral surface of the mouth part by shaving.

3. The fabricating method for a quartz vial according to claim 1, further comprising smoothing the ground, cut or polished outer peripheral surfaces of the tapered portion and the neck part by heating with a burner.

4. A fabricating method for a quartz vial having a body part for containing a substance, a bottom part closing a lower end of the body part, a cylindrical neck part disposed at an upper end of the body part, a cylindrical mouth part disposed above the neck part and having an outer diameter larger than an outer diameter of the neck part, and a tapered portion connecting the mouth part and the neck part, the fabricating method comprising the steps of:

forming an outer peripheral surface of the tapered portion by grinding, cutting or polishing; and after the step of forming the outer peripheral surface of the tapered portion by grinding, cutting or polishing, joining by thermal fusion, to the tapered portion, the neck part that is separately fabricated.

5. The fabricating method for a quartz vial according to claim 4, further comprising the step of forming an outer peripheral surface of the neck part by shaving.

6. The fabricating method for a quartz vial according to claim 5, further comprising the step of forming an inner peripheral surface of the mouth part by shaving.

7. The fabricating method for a quartz vial according to claim 4, further comprising the step of forming an inner peripheral surface of the mouth part by shaving.

8. The fabricating method for a quartz vial according to claim 4, further comprising smoothing the ground, cut or polished outer peripheral surface of the tapered portion by heating with a burner.

9. A fabricating method for a quartz vial having a body part for containing a substance, a bottom part closing a lower end of the body part, a cylindrical neck part disposed at an upper end of the body part, a cylindrical mouth part disposed above the neck part and having an outer diameter larger than that of the neck part, and a tapered portion connecting the mouth part and the neck part, the fabricating method comprising the steps of:

forming an outer peripheral surface of the tapered portion and an outer peripheral surface of the neck part by grinding, cutting or polishing a quartz glass member; and after the step of forming the outer peripheral surface of the tapered portion and the outer peripheral surface of the neck part by grinding, cutting or polishing the quartz glass member, forming the body part by hot working a portion of the quartz glass member adjacent to the neck part, wherein the entire quartz vial including the tapered portion, the neck part and the body part is integrally formed from a single quartz glass member.

10. The fabricating method for a quartz vial according to claim 9, further comprising the step of forming an inner peripheral surface of the mouth part by shaving.

11. The fabricating method for a quartz vial according to claim 9, further comprising smoothing the ground, cut or polished outer peripheral surface of the tapered portion and the outer peripheral surface of the neck part by heating with a burner.

* * * * *